United States Patent [19]

Ezis

[11] Patent Number: 5,358,685
[45] Date of Patent: Oct. 25, 1994

[54] MONOLITHIC, FULLY DENSE SILICON CARBIDE MIRROR AND METHOD OF MANUFACTURING

[75] Inventor: Andre Ezis, Vista, Calif.

[73] Assignee: Cercom Inc., Vista, Calif.

[21] Appl. No.: 115,679

[22] Filed: Sep. 3, 1993

Related U.S. Application Data

[62] Division of Ser. No. 29,713, Mar. 11, 1993, Pat. No. 5,302,561.

[51] Int. Cl.⁵ .............................................. B22F 3/12
[52] U.S. Cl. ..................................... 419/19; 419/28; 419/32; 419/33; 419/35; 419/48; 501/89; 501/90
[58] Field of Search ...................... 419/19, 28, 32, 33, 419/35, 39, 48; 501/88, 89, 90

[56] References Cited

U.S. PATENT DOCUMENTS

| | | | |
|---|---|---|---|
| 3,853,566 | 12/1974 | Prochazka | 106/44 |
| 3,960,577 | 6/1976 | Prochazka | 106/44 |
| 4,108,929 | 8/1978 | Prochazka et al. | 264/29.1 |
| 4,326,039 | 4/1982 | Kriegesmann et al. | 501/90 |
| 4,332,755 | 6/1982 | Murata | 264/65 |
| 4,467,043 | 8/1984 | Kriegesmann et al. | 501/88 |
| 4,569,922 | 2/1986 | Suzuki | 501/89 |
| 4,693,988 | 9/1987 | Boecker et al. | 501/89 |
| 4,753,903 | 6/1988 | Saito | 501/88 |
| 4,874,725 | 10/1989 | Furukawa et al. | 501/89 |
| 4,876,941 | 10/1989 | Barnes et al. | 89/36.02 |
| 5,032,550 | 7/1991 | Derkacy | 501/92 |

*Primary Examiner*—Donald P. Walsh
*Assistant Examiner*—Chrisman D. Carroll
*Attorney, Agent, or Firm*—H. Jay Spiegel

[57] ABSTRACT

A new silicon carbide material is made following a procedure including hot pressing to provide a finished product having a microstructure with an optimal grain size of less than 7 micrometers. The material exhibits a dominant failure mode of intergranular fracture requiring significant energy for crack propagation. The method of manufacturing is cost-effective by allowing the use of "dirty" raw materials since the process causes impurities to segregate at multi-grain boundary junctions to form isolated pockets of impurities which do not affect the structural integrity of the material. End uses include use as optical and electronic substrate materials.

11 Claims, 6 Drawing Sheets

MONOLITHIC, FULLY DENSE SILICON CARBIDE MIRROR AND METHOD OF MANUFACTURING

This application is a division of U.S. application Ser. No. 08/029,713, filed Mar. 11, 1993, now U.S. Pat. No. 5,302,561.

BACKGROUND OF THE INVENTION

The present invention relates to a monolithic, fully dense, silicon carbide mirror or mirror substrate and methods of manufacturing. Applicant is unaware of any prior art teaching a ceramic material and/or method of manufacturing as taught herein nor use of such a material as a mirror.

The following prior art is known to applicant:

U.S. Pat. No. 3,592,942 to Hauck et. al. discloses a lard ceramic material described as "high temperature fabricated polycrystalline alumina, silicon carbide or boron carbide". The present invention differs from the teachings of Hauck et. al. as contemplating a particular grain size, density, Weibull modulus, environment of use and structural mode of crack propagation and resistance thereto nowhere taught or suggested by Hauck et. al.

U.S. Pat. Nos. 3,765,300 and 3,796,564 to Taylor et. al. teach a dense carbide composite for various applications. Taylor et. al. disclose that ". . . it is essential that the granular boron carbide in the initial mixture have a maximum particle size of about 300 microns or less, although coarser material may be employed to make composite bodies useful for less demanding purposes."

Taylor et. al. further disclose that "The modulus of rupture may be as low as 10,000 psi (700 kg/cm$^2$), especially wilere granular boron carbide with a particle size greater than about 300 microns is included in the mix . . . ". As such, Taylor et. al. fail to contemplate the grain size disclosed herein nor the method of manufacturing nor the intergranular fracture and resistance thereto, nor the contemplated environment of use disclosed herein.

U.S. Pat. No. 3,977,294 to Jahn discloses composite laminate material and method. This patent contemplates a composite laminate material including layers of graphite and ceramic materials adhered together through the use of an adhesive. The ceramic materials and method and applications disclosed herein are nowhere taught or suggested by Jahn.

U.S. Pat. No. 4,692,418 to Boecker et. al. discloses a sintered silicon carbide/carbon composite ceramic body having fine microstructure. This patent discloses making of a silicon carbide material and, thereafter, infiltrating a source of carbon therein to provide the composite body. The present invention differs from the teachings of Boecker et. al. as contemplating a monolithic silicon carbide material possessing unique properties and made in a manner not contemplated by Boecker et. al.

U.S. Pat. No. 4,693,988 to Boecker et. al. discloses a single please silicon carbide refractory. The Boecker et. al. material consists of a pressureless sintered product made from starting materials wherein a coarse fraction as well as a fine fraction are present. Boecker et. al. disclose that the coarse fraction has a particle size ranging between 210 and 340 micrometers, huge particles as compared to those contemplated herein. In Boecker et. al., all particles are carried through to the final microstructure, that is, they do not reduce in size during the sintering process. Test results show that such grains incorporated within an SiC microstructure would clearly exhibit transgranular fracture when impacted as compared to the present invention wherein intergranular fracture would occur but mechanisms to resist such fracture exist. The inventive grain size (material microstructure) disclosed in this patent application is preferably equal to or less than 7 micrometers which is required to facilitate intergranular fracture. That is, experimentation has revealed that silicon carbide grains larger than 7 micrometers generally exhibit transgranular fracture and grains smaller than 7 micrometers generally exhibit intergranular fracture. As such, the present invention clearly differs from the teachings of Boecker et. al.

U.S. Pat. No. 4,876,941 to Barnes et. al. discloses a ceramic composite comprising titanium boride combined with aluminum nitride. Hot pressing techniques are employed in the manufacture of this material. The present invention differs from the teachings of Barnes et. al. as contemplating a monolithic silicon carbide evidencing a mode of failure defined as intergranular in nature. While aluminum nitride is employed in the process of manufacturing the inventive ceramic, it is only used as a densification aid and in proportion much smaller than the proportion of silicon carbide which is employed. In a composite, such as that which is disclosed by Barnes et. al., the aluminum nitride is an integral part of the microstructure, that is, aluminum nitride grains are present and can be specifically identified as aluminum nitride. In contrast to this, in the present invention, aluminum nitride behaves as a densification aid. After processing, one may not identify specific aluminum nitride grains. Aluminum nitride is not an integral part of the microstructure and, chemically, the finished ceramic body does not show the presence of aluminum nitride.

K. Nakamura and K. Maeda, in Silicon Carbide Ceramics, Volume 2, Edited by S. Somiya and Y. Inomata, Elsevier Applied Science, 1991, disclose hot-pressed SiC ceramics. These investigators have demonstrated a hot-pressed silicon carbide material using aluminum nitride (AlN) as a processing aid with a Weibull modulus of 13.8. The inventive silicon carbide material disclosed herein contemplates a Weibull modulus within a range of 18 to 30, much higher than Nakamura et. al. which makes it possible to produce components with outstanding performance characteristics and exceptional reliability where prior state-of-the-art materials could not be used. The present invention also differs from the teachings of Nakamura et. al. as contemplating densification techniques, relation between weight of AlN addition to SiC powder surface area and end use nowhere taught or suggested therein.

SUMMARY OF THE INVENTION

The present invention relates to a fully dense, monolithic form of silicon carbide material, method of manufacturing and end use as a mirror material. The present invention includes the following interrelated objects, aspects and features:

(A) The particular silicon carbide ceramic material which is employed is made up of constituent substances including at least 92%, by weight, silicon carbide of the alpha or beta type. Powder specifications, in the preferred embodiment, also include from 0.01% up to 2% iron, from 0.10% up to 2% free carbon, from 0.01% up to 1.5% aluminum, from 0.02% up to 3% silicon dioxide, from 0.01% to 2.5% oxygen and from 0.01% up to 0.15% free silicon, with these figures being by weight. Other cation impurities such as Ca, Mg, Ti, Na, W, etc. are also permissible as well as anion impurities such as N. These impurities are present ill most commercially available powders on a trace basis, e.g., 0.01% or less.

(B) Concerning particles making up the powder, average particle size should not exceed 3 micrometers, with maximum particle size being less than 10 micrometers and with the optimal maximum particle size being no greater than 7 micrometers. Furthermore, the powder surface area should exceed 5 $m^2/g$. As will be described in greater detail hereinafter, due to the unique process of manufacture of the inventive material, relatively impure silicon carbide powder may be employed.

(C) In the manufacture of the inventive material, as will be described in greater detail hereinafter, a dry procedure or, alternatively, a wet procedure may be employed. After one or the other of these procedures has been employed, hot pressing of the processed powder is accomplished under precise conditions of temperature and pressure through a regimen followed by a cooling down procedure which results in manufacture of the finished inventive material.

(D) The new fully dense, fine-grained monolithic silicon carbide with a high Weibull modulus between 18 and 30 has been evaluated as a structural substrate for the production of optical surfaces with essentially no defects observed on polished surfaces as defined by the International Disk Drive Equipment and Material Association, Disk/Substrate Committee. The specification is titled "Specification For Substrates For Rigid Disks". Prior art materials are very difficult to grind and polish without grain pullout. The polished alpha SiC materials disclosed herein are practical mirrors for various applications. Prior art materials were generally produced by a chemical vapor deposition (CVD) process which is very time consuming and costly and produces a fragile material that lacks toughness. The fine-grained, high Weibull modulus materials of the present invention can be used to produce mirrors of equivalent optical quality with reduced processing time and cost and with improved fracture toughness and reliability.

As such, it is a first object of the present invention to provide a monolithic silicon carbide mirror and method of manufacturing.

It is a further object of the present invention to provide such a material laving an optimal grain size of less than 7 micrometers.

It is a still further object of the present invention to provide a fully dense (99.5% of theoretical density or greater), high strength, highly reliable material characterized by a Weibull modulus of greater than 18.

It is a still further object of the present invention to provide such a material made using hot pressing techniques at relatively low temperatures.

It is a still further object of the present invention to provide such a material which fractures in an intergranular fashion and resists such fractures.

It is a still further object of the present invention to provide such a material that contains segregated grain boundaries.

It is a still further object of the present invention to provide such a material that exhibits a high fracture toughness, an exceptionally high degree of thermal conductivity and a high electrical resistivity.

It is a still further object of the present invention to provide such a material which can be polished with essentially no grain pull out which can result in deleterious surface defects.

It is a still yet further object of the present invention to provide such materials with mirror-like surfaces which can be used for various applications including the production of media storage discs.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
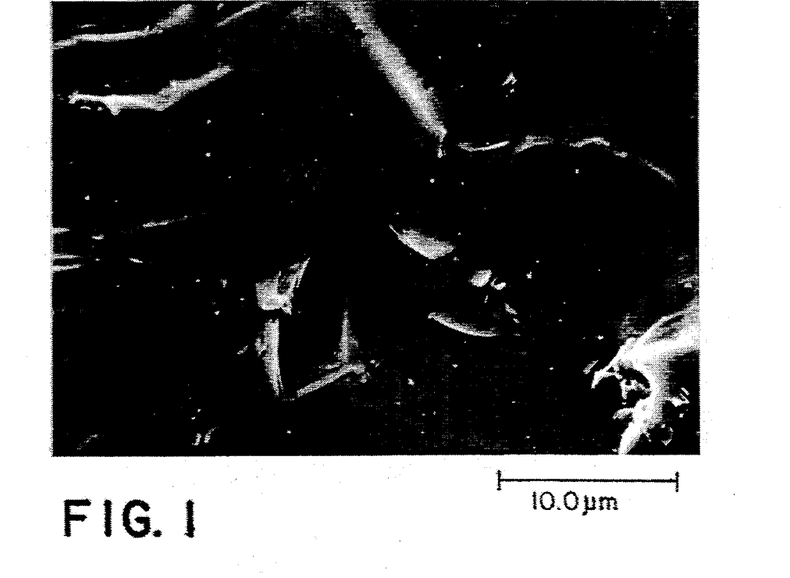
FIG. 1 shows a photomicrograph of a fracture surface of a commercially available monolithic silicon carbide material as known in the prior art, e.g., hot pressed using boron and carbon as sintering aids.

Reference is first made to FIG. 1 which depicts a photomicrograph showing the fracture surface of a prior art silicon carbide material. This photomicrograph is presented in this application as an example of the prior art and to place the present invention in its proper perspective.

As should be understood, when reviewing FIG. 1, the fracture surface of the prior art silicon carbide depicted exhibits transgranular fracture. What is meant by this is that when the material depicted in FIG. 1 fractures, it "cleaves" linearly. Thus, when a fracture is induced in the silicon carbide material shown in FIG. 1, limited resistance to the fracture front is exhibited due to the linear nature of the fracture.

Figure 2:
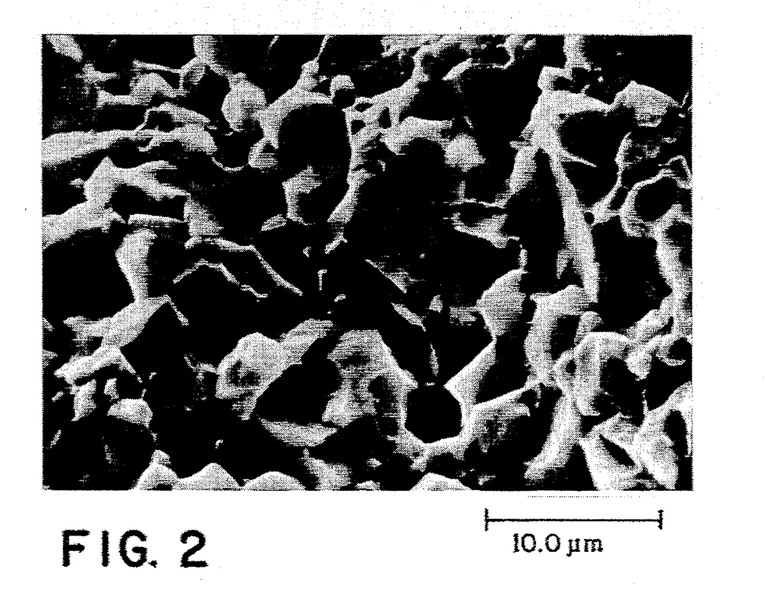
FIG. 2 shows a photomicrograph of the fracture surface of the silicon carbide material made in accordance with the teachings of the present invention.

In contrast to the teachings of the prior art silicon carbide material as illustrated in FIG. 1, FIG. 2 depicts a photomicrograph of the fracture surface of a monolithic, fully dense silicon carbide material made in accordance with the teachings of the present invention. As should be understood from FIG. 2, the fracture surface of the inventive silicon carbide material exhibits intergranular fracture. What this means is that when the silicon carbide material shown in FIG. 2 fractures, it does so non-linearly in an undulating path back and forth between the various grains contained therein. In other words, the fracture surface shown in FIG. 2 is the result of many small fractures between and around the grains. Thus, when the new alpha SiC fractures via an intergranular mechanism many cracks occur resulting in the dissipation of very large amounts of energy thereby offering resistance to crack propagation significantly increasing the fracture toughness of the new hot-pressed alpha SiC. The non-linear nature of fractures which are formed in the inventive material as shown in FIG. 2 renders the material quite effective in resisting fracture. Forces imposed upon the material through impacts are spread laterally with respect to the impact direction with forces being spread in such a manner that energy is rapidly dissipated in directions other than the direction of an incident impact. This is to be compared, again, with results obtained through the use of the silicon carbide material illustrated in FIG. 1 wherein an impact causes the material to easily cleave and fail catastrophically.

In an important aspect of the present invention, aluminum nitride is utilized as a densification agent. As explained above in the BACKGROUND OF THE INVENTION, it is known to utilize aluminum nitride in combination with silicon carbide to form a composite. However, applicant's use of aluminum nitride in the inventive process does not result in the formation of a composite, for many reasons including the small proportion of the aluminum nitride as compared to the amount of silicon carbide employed. Additionally, the Nakamura et. al. publication discloses use of aluminum nitride as a sintering aid at concentrations of 0.5% to 4%, by weight, of silicon carbide. However, Nakamura et. al. fail to contemplate the significance of the ratio between the weight of addition of aluminum nitride and the total surface area of the silicon carbide powder, nor do Nakamura et. al. contemplate the densification techniques disclosed herein nor the resulting enhanced Weibull modulus nor the ability to form segregated grain boundaries.

Aluminum nitride (AlN) makes the surfaces of the silicon carbide "active" and increases diffusional kinetics via the grain boundaries thereof. Through experimentation, applicant has discovered that the optimum weight amount of aluminum nitride to be added to the silicon carbide is based upon the surface area of the silicon carbide powder. In this regard, the total amount of surface area of the silicon carbide powder generally defines the grain boundary surface area and, therefore, the amount of area which must be "activated" to optimize the finished ceramic product. Through experimentation, applicant has found that the optimum content of aluminum nitride is 0.10-0.25%, by weight, aluminum nitride for each $m^2/g$ of surface area of silicon carbide.

Applicant has discovered that below a minimum weight addition level of aluminum nitride with respect to the surface area of the silicon carbide powder, there are insufficient quantities of aluminum nitride available to activate surface and/or bulk diffusional kinetics to efficiently and totally densify the silicon carbide material. That is, the sintering event is inefficient and will produce ceramic bodies that do not meet density requirements of the finished products. In the case of highly polished optical surfaces as disclosed herein, the finished ceramic body must be as close to theoretical density as possible, certainly at least 99.5% of theoretical density. Ceramic bodies that contain a relatively high degree of porosity (low density) are characterized by low Weibull modulii because pores and pore clusters comprise the dominant flaw population.

For example, the use of 0.05% by weight aluminum nitride for each $m^2/g$ of surface area of silicon carbide powder where the silicon carbide powder is of the alpha type and has 12 $m^2/g$ surface area will result, in accordance with the hot pressing conditions disclosed hereinafter, in a finished ceramic body having a density of about 87% of theoretical density. Such a ceramic body is characterized as having a relatively low MOR and is represented by a low Weibull modulus, less than 10. Fracture surface examination of such a body shows that cracks initiate at large pores and at regions of pore clustering. Above the maximum permissible ratio of addition by weight of aluminum nitride to surface area of silicon carbide powder, to-wit, above 0.25% by weight aluminum nitride for each $m^2/g$ of surface area of silicon carbide, a surplus of aluminum nitride exists in an unreacted form and remains at the grain boundaries or forms compounds based upon aluminum nitride which constitute a secondary intergranular phase. This phase may be crystalline, amorphous or a combination thereof. Intergranular phases and/or large particles of unreacted aluminum nitride form defects which are deleterious to the performance of the material and produce materials, again, with low Weibull modulii. Furthermore, the presence of amorphous intergranular materials decreases the quality of polished mirror surfaces and media storage device surfaces.

The aluminum nitride activates the silicon carbide grain surfaces in a solubility reaction. At the hot pressing temperatures disclosed hereinafter, the solubility of aluminum nitride is confined to the surfaces of the silicon carbide particles. Furthermore, the solubility of aluminum nitride in silicon carbide is also limited. Therefore, when the solubility limit is exceeded, that is, additional aluminum nitride cannot be absorbed into the silicon carbide structure, the superfluous aluminum nitride remains in the grain boundaries in an unreacted form or reacts with other grain boundary materials, for example, silica, to form intergranular materials.

Applicant has selected aluminum nitride for use as a densification aid due to its efficiency as a sintering aid and due to reduced thermal energy required for densification. That is, AlN enables SiC mixtures to be hot pressed at reduced temperatures thereby decreasing exaggerated grain growth during hot pressing, enabling better control over grain size in the final developed microstructure, e. g., grains of 7 micrometers or less. Reduced temperatures deter grain growth during processing. Most standard grades of aluminum nitride powder have an average particle size of 4.0 micrometers or less and, as such, are acceptable as a sintering aid. It must be noted, however, that aluminum nitride is hydroscopic and, as such, requires handling in a manner avoiding contact with water or water vapor. In light of this factor, the inventive process may not involve the use of water or water vapor unless the aluminum nitride powder is coated with a protective film. However, if the aluminum nitride powder is coated with a protective film to preclude hydrolysis, then water may be used as a milling/homogenizing media.

Figure 10:
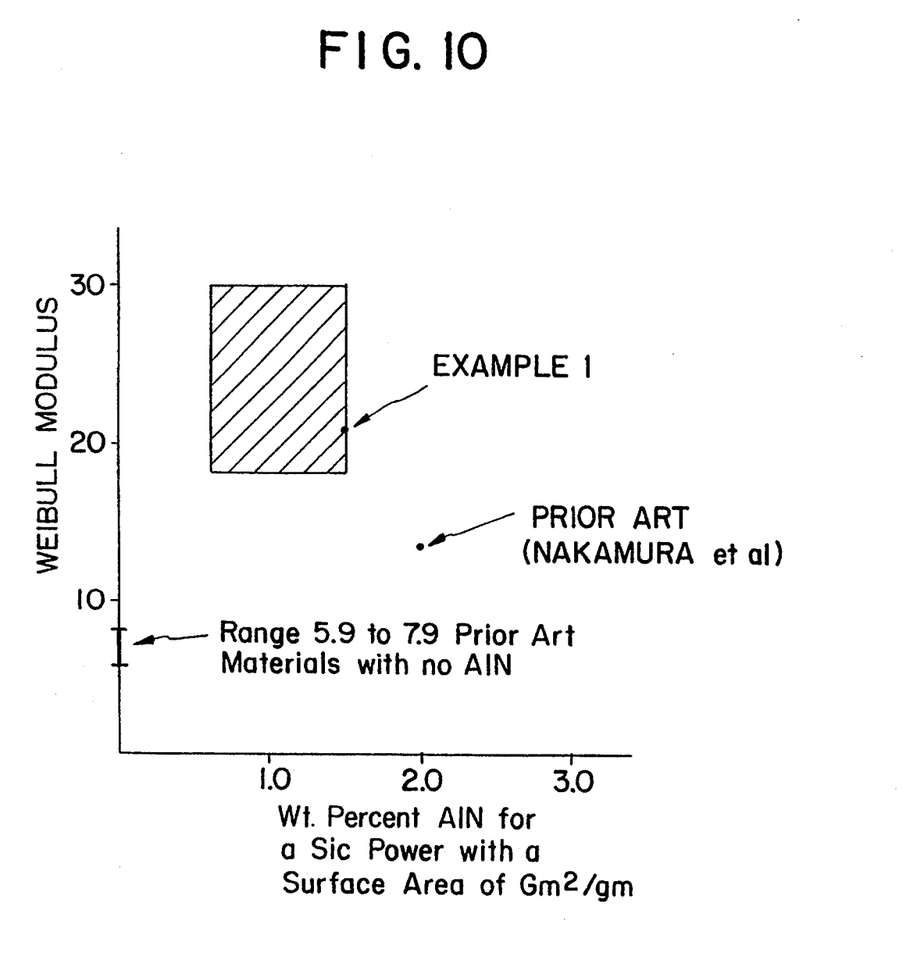
FIG. 10 is a graph silowing Weibull modulus variation with variation of Aluminum Nitride (sintering aid) content.

FIG. 10 shows the significantly enhanced Weibull modulus which results in accordance with the teachings of the present invention, particularly maintaining the proportion of AlN (sintering aid) within the disclosed range. FIG. 10 shows a data point representative of the Nakamura et. al. material.

Through experimentation, Applicant has found that impurities in the raw materials do not harm the eventual performance of the finished silicon carbide material. This is an important factor since highly pure raw materials are significantly more expensive than relatively "dirty" grades of raw materials. The inventive process which is employed in making the silicon carbide material disclosed herein causes impurities to segregate at grain boundaries and therefore these impurities do not have a direct impact on the intrinsic strength of the present invention. The grain boundaries segregate the cation impurities, forming discontinuous pools of impurities, generally submicrometer in size, which are inert within the finished product material. The inventive material has been made using silicon carbide powder at prices less than $1.50 per pound, much less than the price per pound of more highly pure silicon carbide powder.

In a further aspect, one may apply Weibull analysis to describe the strength variation of various ceramic materials. Weibull analysis is based upon the "weakest link of the chain" theory whereby the strength of a ceramic material strongly depends upon the size and shape as well as frequency of internal defects . These internal defects will reside in areas where failures are more likely to occur. In performing Weibull analysis, sufficient statistically significant amounts of test specimens must be prepared and tested. Uniform standards for dimensions are complied with and flexural strength is calculated through the use of a loading and testing fixture in a manner known to those skilled in the art. A plurality of specimens are tested, one-by-one, and may be ranked in ascending order of strength with each specimen being assigned a probability of failure according to its corresponding rank in order.

The probability of failure of any one specimen is calculated by using the equation:

$$F = \frac{n - 0.5}{N}$$

where F is the probability of failure, N is the total number of specimens, and n is the rank of the specific specimen being tested.

Weibull analysis shows the relationship between the probability of failure and the strength of a specimen through the use of the following equation:

$$\ln\ln \frac{1}{1 - F} = m\ln S - m\ln So$$

where ln is the natural logarithm, F is the probability of failure, S is the strength of the specific bar, So is the characteristic strength and m is the Weibull modulus.

In general, a high Weibull modulus means narrow strength distribution. The characteristic strength represents the strength having 63.2% of failure probability. Thus, the Weibull modulus is calculated by linear-least-square fitting of the data points calculated through the use of the latter-mentioned formula for the relationship between the probability of failure and strength of each specimen.

Table A displays the various properties of five conventional silicon carbide materials as well as the inventive silicon carbide material including display of the Weibull modulus. As is seen in Table A, the Weibull modulus for the present invention is greater than 20 whereas the next best material exhibits a Weibull modulus of no greater than 14. This fact combined with the fact that the measured flexural strength for the inventive silicon carbide material generally exceeds 100,000 psi, should make clear the significant improvement in performance of the present invention as compared to the prior art. While the Nakamura et. al. material also exhibits a flexural strength in excess of 100,000 psi, Nakamura et. al. require the use of extremely expensive, highly pure constituent ingredients to achieve this level of flexural strength. By contrast, as disclosed herein, the present invention maintains all inventive parameters even where relatively "dirty" constituent materials are employed.

TABLE A

| SiC type | α-SiC (SC-501)* | α-SiC(SASC)** | β-SiC*** |
|---|---|---|---|
| Designation | Hot Pressed | Sintered | Sintered |
| Density ($g/cm^3$) | 3.2 | 3.11–3.13 | 3.12–3.15 |
| Free C (wt %) | 0.24 | 1.09 | 0.89 |
| Oxygen (wt %) | N/A | 0.059 | 0.044 |
| MOR test (°C.) | RT**** | RT | RT |
|  | 1200 | 1370 | 1370 |
| Mean MOR (Mpa) | 750 | 380 ± 46 | 423 ± 55 |
|  | 750 | 307 ± 50 | 388 ± 59 |
| Weibull (m) | 13.5 | 9.6 | 9.5 |
|  | 13.5 | 7 | 8.1 |

| SiC type | SiC/Si (KX01)** | αSiC (Type A)***** | αSiC (Type B)***** |
|---|---|---|---|
| Designation | Reaction-bonded | Hot Pressed | Hot Pressed |
| Density ($g/cm^3$) | 2.89–2.91 | 3.16–3.22 | 3.20–3.24 |
| Free C (wt %) | 0.22 | 1.20 | 2.0% Max |
| Oxygen (wt %) | 0.11 | 0.10 | 0.64 |
| MOR test (°C.) | RT | RT | RT |
|  | 1200 | 1200 | 1200 |
| Mean MOR (Mpa) | 385 ± 58 | 520 ± 60 | 670 ± 42 |
|  | 415 ± 51 | 510 ± 54 | 648 ± 49 |
| Weibull (m) | 8 | 8 | 26 |
|  | 9.2 | 9.5 | 24 |

*Hitachi (Nakamura et al. material)
**Carborundum Co.
***General Electric
****Room Temperature
*****Cercom Inc.

In conducting the process to produce the inventive alpha SiC materials, blends of commercial SiC powders and AlN powders are prepared, homogenized, and hot-pressed in accordance with the parameters described below.

A fine-grained silicon carbide powder as defined below by particle size is used. Generally, the average particle size should not be greater than 3 micrometers to result in the new alpha SiC composition of the current invention which predominantly exhibits intergranular fracture. A powder purity specification is prepared in accordance with the parameters displayed below in Table B as follows:

TABLE B

| Constituent Material | % By Weight in Mixture |
|---|---|
| Si C | 92% minimum |
| Fe | 0.01–2.0 |
| Free C | 0.10–2.0 |
| Al | 0.01–2.0 |
| SiO2 | 0.02–3.0 |
| Oxygen | 0.01–2.5 |
| Free Si | 0.01–0.15 |
| Other, Individually | Trace <.01 |

The powder purity specification shown in Table B is also required, in accordance with the teachings of the present invention, to comply with additional requirements. The particles included in the mix may not exceed 10 micrometers in diameter with an average particle diameter of 0.3 to 3 micrometers being optimal. The cumulative surface area of the particles should be within the range of 3 to 20±1 m$^2$/g. This factor may be measured in a manner known to those skilled in the art.

With the silicon carbide powder purity selected in accordance with Table B and the above additional specifications including an appropriate selection of AlN powder, powder formulation and processing of powder mixtures may proceed, in accordance with the teachings of the present invention, in a powder homogenizing and comminution procedure which may either comprise a dry procedure or a wet mill procedure.

In the dry procedure, a master mix is prepared with the weights indicated below being exemplary. The master mix techniques set forth below are used to enable introducing of small amounts of secondary constituent powders (on a weight percentage basis) into a main powder constituent in a homogeneous basis particularly where the powder process is a dry process. These techniques are generally known in the art.

In a 25 liter polypropylene bottle, the following constituent substances are added: 15 Kg of a grinding media consisting of a fully dense porcelain body made up of about 90% Al$_2$O$_3$ and the balance SiO$_2$, i.e., a ½ inch diameter rod, 5100 g of alpha-type SiC powder and 900 g of aluminum nitride powder.

When this mixture has been prepared, homogenization is accomplished by adding 6500 milliliters of methanol, ethanol or isopropyl alcohol (all anhydrous), milling for approximately 5-8 hours, subsequently pan drying the mixture for 20-24 hours at about 90 degrees C. and, thereafter, dry milling for one half hour with the ½ inch diameter grinding rod.

Thereafter, the mixture is blended in the proportion of 81 kg of silicon carbide combined with 9 kg of the master mix as described above until homogeneous.

As described above, an alternative to the dry procedure comprises a wet mill process. In this process, in a 25 liter polypropylene bottle, 15 kg of grinding media, as described above, is added and a powder charge is provided including about 6649 g of silicon carbide and 101 g of aluminum nitride. 7500 milliliters of alcohol (anhydrous) is added and wet milling is carried out to achieve homogeneity between the constituent ingredients followed by drying to remove the carrier (alcohol), followed by dry milling to break up the agglomerates and screening through 30 mesh.

After the powder has been processed in accordance with either one of the procedures described above, the intermediate product is then ready for introduction into a hot press mold cavity and subsequent hot pressing to full density. To commence the hot pressing procedure, the hot pressing chamber is evacuated to 1.5 TORR and then the chamber is either back filled with nitrogen or argon or the entire procedure is run under vacuum. Table C, displayed below, sets forth the preferred process steps for the hot pressing multiple SiC plates dimension 12"×12"×2". The schedule shown is representative of a large commercial induction-heated vacuum hot press and has been adapted accordingly. The process steps take into consideration such concerns as thermal mass, achieving thermal equilibrium, outgassing of raw materials, etc.

TABLE C

| Temperature (Degree-C.) | Pressure Part (psi) | Parameters (Ramp rate, powder setting, hold time, and atmosphere) |
|---|---|---|
| Room Temp | 500 | |
| 1630 | 500 | Hold 2 hours then increase @ 1° C./minute |
| 1820 | 1000 | Hold 40 minutes, then increase @ 1° C./minute |
| 1895 | 1500 | Hold 40 minutes, then increase @ 1° C./minute |
| 1900 | 2000 | Hold 40 minutes |
| *1900 | 2500 | Hold 1.5 hours, then increase @ 1° C./minute |
| 2040–45 | 2500 | Hold until ram movement essentially stops, not to exceed 5 hours |

*80% of drop must come out of system at this temperature, or full density will not be achieved. That is, a closed porosity situation must be established, or volatization of metals/metaloids occurs as temperature increases - these materials assist in densification. This is the essence of the hot pressing procedure. That is, the hot pressing procedure must be adapted so that at least 80% density (of theoretical) is obtained at temperatures equal to or less than 1900° C. Temperatures above 1900° C. are used to achieve a fully dense state. That is, to remove the remainder of void volume. Temperatures above 2050° C. are not used so as to preclude exaggerated grain growth.

Through experimentation, Applicant has found that at approximately 80% of theoretical density, most porosity within the ceramic body is closed. Furthermore, above 1900° C., sintering aids and cation impurities begin to volatize vis.a.vis decomposition. In order to effectively densify the ceramic body to near theoretical density, sintering aids must remain within the body. In a closed porosity condition, sintering aids cannot leave the body by volatization, that is, the sintering aids are captured within the body. Therefore, in accordance with the teachings of the present invention, it is important that a closed porosity condition be achieved before the critical temperature of 1900° C. is exceeded.

After the procedure set forth in Table C has been followed, the resulting product, if of large cross-sectional area, must be cooled down in a controlled fashion or it will be subject to thermal shock The cool down procedure is determined emperically and is adapted to the equipment used and the part(s) being manufactured. Generally, the hot pressing pressure is allowed to decay linearly with decreasing temperature with all pressure being removed at 1500° C. Temperature decay rate is the most important consideration wherein temperature is reduced at a rate compatible with minimal thermal stress developing in the cooling SiC product. Where small cross-section articles are involved, they may be cooled by allowing the furnace in which they are contained to naturally cool. The finished product described herein will result from following of these procedures.

SPECIFIC DESCRIPTION OF A SPECIFIC APPLICATION

There are major industrial requirements for mirrors for various applications and for substrates for media storage discs. Silicon carbide has been considered for these applications because of its high specific strength and high modulus. Most of the silicon carbide mirrors have been fabricated using chemical vapor deposition (CVD), a slow and costly procedure. Heretofore the production of media storage discs have been essentially unsuccessful because of the stringent "uniformity of surface" requirements.

The use of relatively low-cost hot pressed SiC has not been successful because of the difficulty of producing uniform, defect-free optical surfaces.

Figure 3:
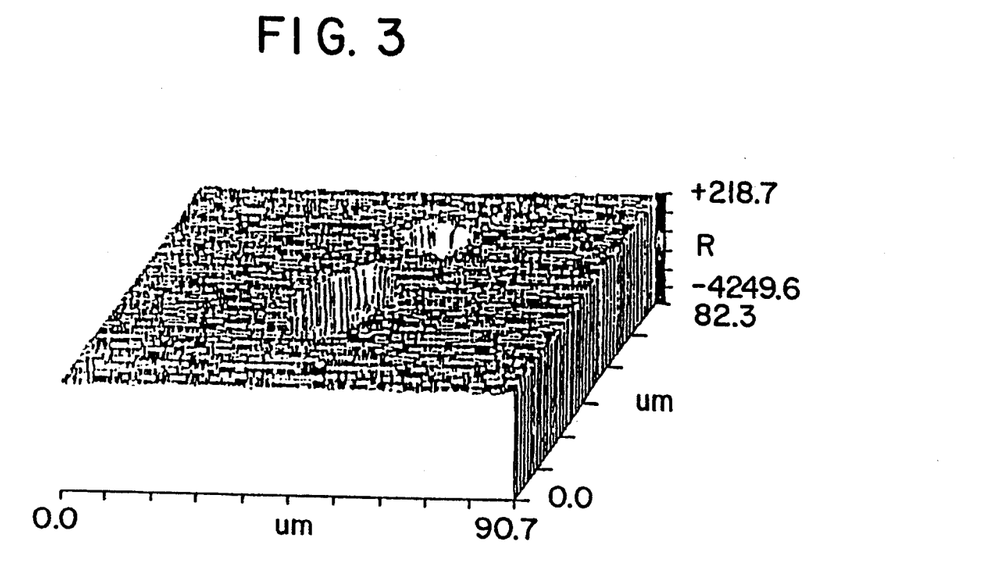
FIG. 3 shows a laser profilimetry study of a polished surface of a prior art SiC material; the results show an rms surface of 1466.61Å and surface defects resulting from grain pull-out during polishing.

The present fully-dense, fine-grained monolithic alpha SiC materials with segregated grain boundaries and high Weibull modulii can be used advantageously for the fabrication of various structures which require highly polished surfaces. For example, mirrors and substrates for media storage discs require surfaces which are highly polished and free of surface defects. When state-of-the-art materials which have low Weibull modulus are polished, "grain pull-out" occurs leading to surface defects as shown in FIG. 3. On the other hand, when the new high Weibull modulus materials are polished, essentially no grain pull-out occurs resulting in a highly polished surface with minimum surface defects as shown in FIG. 4.

Figure 4:
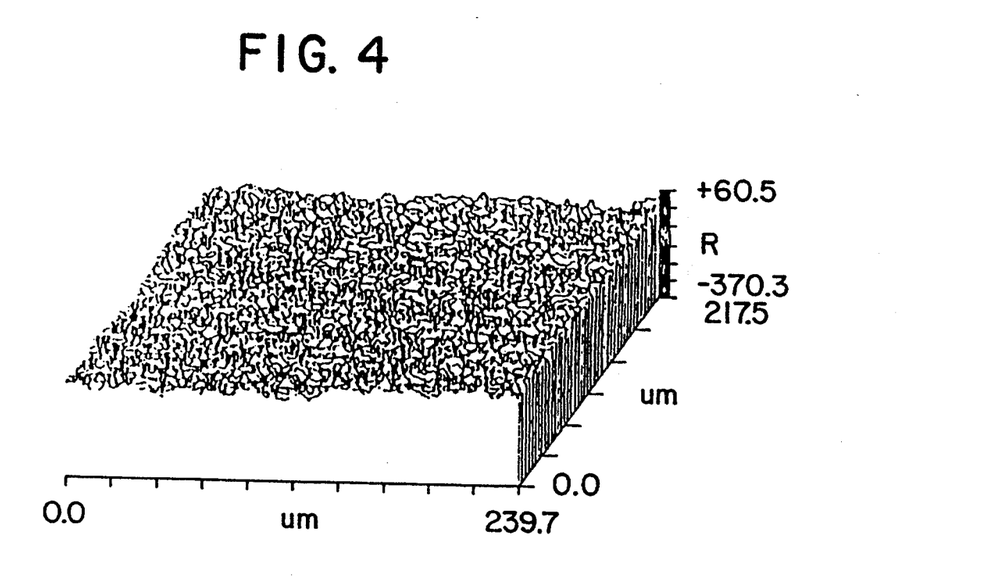
FIG. 4 shows a laser profilimetry study of a polished surface of the new alpha SiC materials; the results show an rms surface of 15.03Å with no grain pull-out and a defect-free surface.

FIGS. 3 and 4 are laser profilimetry studies which show the rms surface profiles in Angstroms. Thus, it should be noted that the prior art material exhibits pull-out and a rms surface of 1466.61Å. Whereas, the new alpha SiC, which is the subject of this invention, had a rms surface of 16.03Å with no grain pull-out, a truly remarkable improvement.

Figure 5:
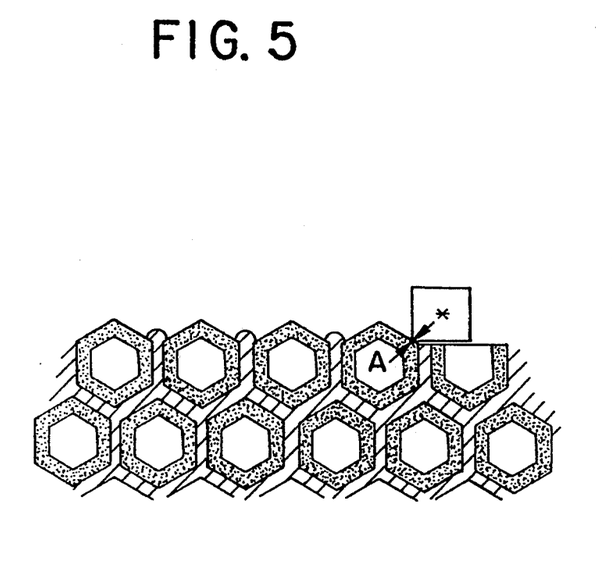
FIG. 5 shows a schematic of the mechanism believed to account for grain pull-out when SiC materials with low Weibull modulus are polished.

The significant improvement is believed to result from the high Weibull modulus which is indicative of the uniformity and low quantities of critical defects within the new alpha SiC material. This is shown schematically in FIG. 5. The schematic representation of the grinding and polishing operation shown in FIG. 5 illustrates what is thought to happen when a particle of diamond grinding media hits a "high spot" of a grain sticking up from the surface. The arrow marked with an asterisk shows the resultant force from a combined downward force (pressure) and the movement of the particle of diamond grinding media from right to left. Contact with the protruding grain at point A results in a rotational force applied to the grain. If there is any non-uniformity (i.e., defects) around the grain subjected to the resultant force from the particle of grinding media, there will be a propensity for crack initiation starting at the defect resulting in the grain of alpha SiC being "torn out" or "pulled out" of the surface leaving a surface defect. This can be seen in FIG. 3 when grain pull-out produces a surface defect.

The inventive alpha SiC materials with high Weibull modulus exhibit very low critical defect concentrations and can be ground and polished without significant grain pull-out. The inventive alpha SiC materials are an outstanding advance in the state-of-the-art because highly reliable structural elements can be designed, manufactured and polished to meet essentially any structural or optical requirement.

The following are examples of practicing of the inventive process.

EXAMPLE 1

Figure 6:
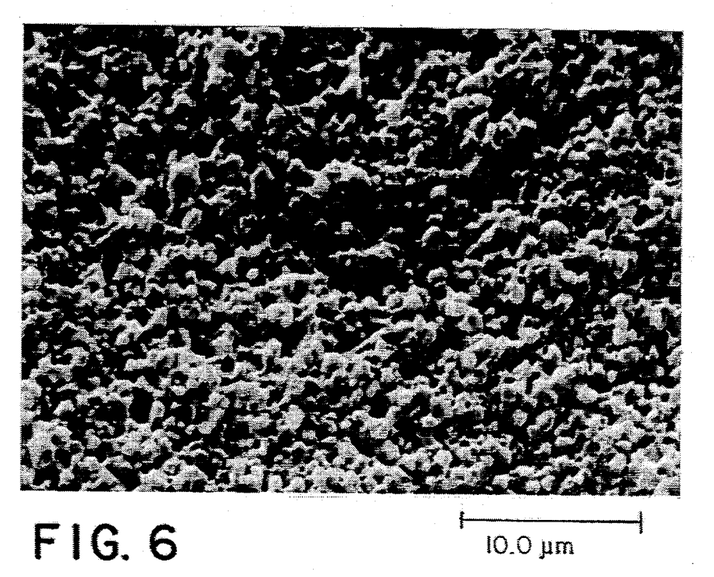
FIGS. 6 and 7 comprise photomicrographs showing the fracture surface of a monolithic, fully dense silicon carbide material made in accordance with the teachings of Example 1.
Figure 7:
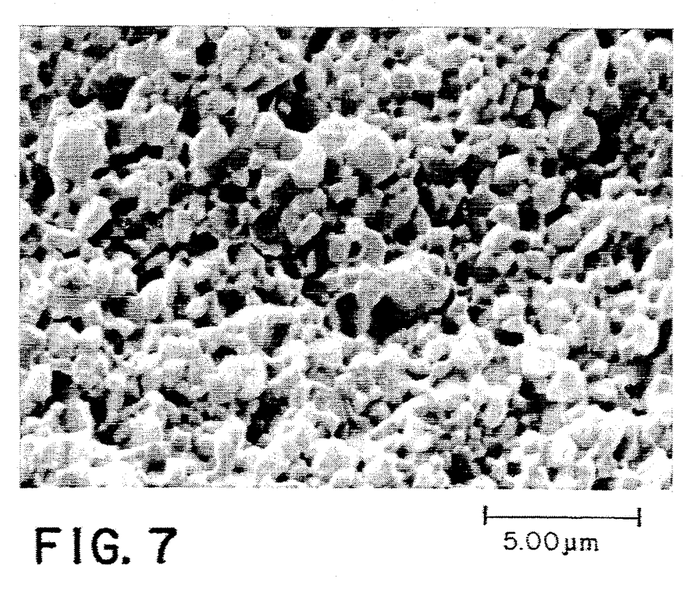

Commercially available Ultrafine Alpha-Type Silicon Carbide Powder was used as the starting powder. This grade has an average particle size of 0.7 micrometers and the measured surface area of the particles was 13 $m^2/g$. Given this high surface area to weight ratio, 3% by weight of aluminum nitride was used as a sintering aid. The powder was processed in anhydrous alcohol to prevent aluminum nitride hydrolysis. Neoprene lined jar mills with $Al_2O_3$ grinding media were used to homogenize the batched powder. A time increment of 6 hours at a slurry viscosity of 200 centipoise produced a well dispersed powder blend as determined by optical microscopy. All powders were prepared for cold pressing by pan drying, dry milling and subsequent screening in accordance with the teachings of the process as described hereinabove. Preforms were produced by pressing in steel dies to a green density of approximately 45% of theoretical. A die body and die cavity were prepared using the inventive silicon carbide procedures as described herein. Hot pressing was conducted at 3500 psi and at a temperature of 2000° C. with 85% of density being developed below or at a temperature of 1900° C. Thereafter, three hours of treatment at the ultimate hot pressing temperature was required to reach full density. Evaluation of the finished microstructure occurred with particular emphasis on evaluation of representative fracture surfaces. These were examined by optical and scanning micrography. Etched samples showed no evidence of porosity and a generally equiaxed fine-grained microstructure. Grain size was measured by using the ASTM E112 standard and was calculated to be 2.16 micrometers. FIGS. 6 and 7 are photomicrographs of representative fracture surfaces at 3000× and 5000× magnification, respectively. They distinctly show extensive intergranular crack propagation. Intergranular fracture corresponds to a crack deflection failure model and requires significant energy for crack propagation, thereby increasing the fracture toughness of the overall material. The physical properties of the finished ceramic material were measured or calculated as follows: density was measured by water immersion to be 3.219 $g/cm^3$, slightly exceeding the calculated theoretical density; the elastic and shear modulii are 64.22 Mpsi and 28.06 Mpsi, respectively; Poisson's ratio was calculated to be 0.14; Knoop hardness using 0.5 kg loading was calculated to be 2747 plus or minus 63 $kg/mm^2$. No evidence of porosity was found which is supported by the measured density.

EXAMPLE 2

Figure 8:
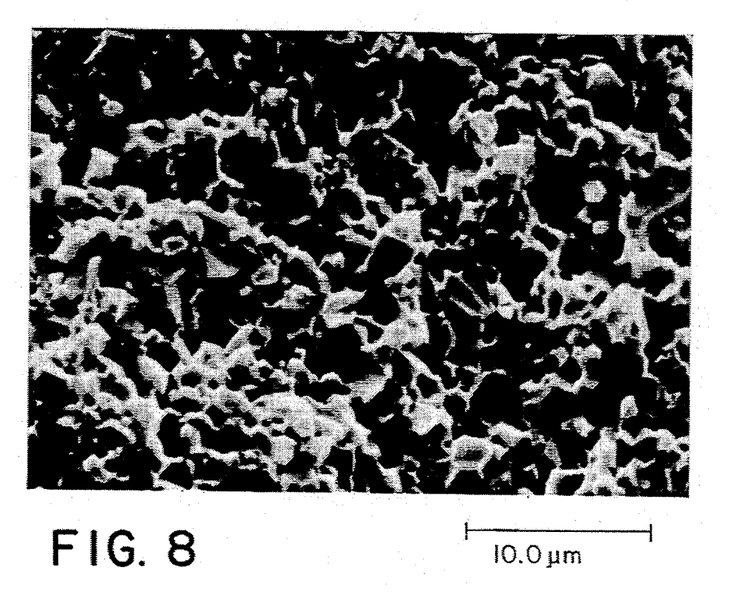
FIG. 8 comprises a photomicrograph showing the intergranular fracture surfaces of a ceramic material made as set forth in Example 2.

A monolithic, fully dense alpha silicon carbide (commercially available) was prepared using silicon carbide having a surface area to weight ratio of 12 $m^2/g$. The powder was processed in conjunction with 1.5%, by weight, aluminum nitride with wet milling in anhydrous isopropyl alcohol for 8 hours. Hot pressing was conducted at a temperature of 2000° C. and a pressure of 3000 psi for 2 hours. Etched polished samples were examined by optical microscopy. The samples showed no evidence of porosity and a generally equiaxed fine-grained grained microstructure. The average grain size was about 2 micrometers with very few grains larger than 7 micrometers. The samples showed predominantly intergranular fracture surfaces as shown in FIG. 8 which comprises a photomicrograph at 3000× magnification. The samples were fully dense with a density of about 3.2 g/cm$^3$ and the elastic and shear modulii were about 66 Mpsi and 29 Mpsi, respectively. Poisson's ratio was calculated to be about 0.15 and Knoop hardness using 0.5 kg loading was about 2800 kg/mm$^2$. Fracture toughness was calculated to be 4.5 MPa m$^{\frac{1}{2}}$. The oxygen content of the finished product was less than 2% by weight.

EXAMPLE 3

Figure 9:
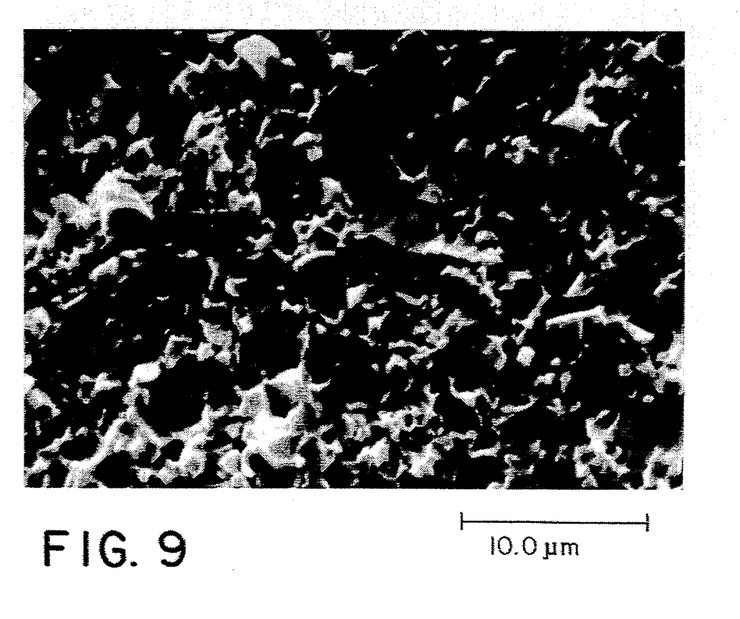
FIG. 9 comprises a photomicrograph showing the fracture surfaces of ceramic material made in accordance with the parameters of Example 3.

Monolithic, fully dense alpha silicon carbide material was made using, as the raw material, commercially available silicon carbide having a surface area to weight ratio of 15 m$^2$/g. 1.5% by weight of aluminum nitride was mixed with the silicon carbide material and the mixture was processed using wet milling in a ketone solvent [methyl ethyl ketone (MEK)] for 8 hours. The die body and die cavity were prepared using the inventive silicon carbide procedures. Hot pressing was conducted at a temperature of 2000° C. and a pressure of 3000 psi for 2 hours. For all samples, diffraction results show no evidence of an amorphous phase or a crystalline phase other than silicon carbide. Etched polished samples were examined by optical microscopy with all samples showing no evidence of porosity and generally equiaxed fine-grained microstructure. The average grain size was calculated to be 1.6 micrometers with very few grains larger than 7 micrometers. All samples show predominantly intergranular fracture surfaces indicating that there was extensive crack deflection during failure. This type of failure mode generally leads to high fracture toughness. The density of the finished materials was about 3.20 g/cm$^3$, as should be expected giving the lack of porosity noted above. The measured elastic and shear modulii were about 59 and 26 Mpsi, respectively, with Poisson's ratio being calculated to be about 0.15. Knoop hardness using 0.5 kg loading was about 2800 kg/mm$^2$ while fracture toughness was about 3.9 MPa m$^{\frac{1}{2}}$. The lower fracture toughness (as compared to the material in Example 2) is attributable to more grains showing transgranular fracture, although the fracture surface is predominantly intergranular in nature. The oxygen content was about 2% by weight. FIG. 9 shows the fracture surface of the ceramic material made in accordance with the parameters of Example 3, showing predominantly intergranular fracture surfaces. FIG. 9 comprises a photomicrograph at 3000× magnification.

The materials made in accordance with the teachings of Examples 1, 2 and 3 each have a calculated Weibull modulus of greater than 20, more than twice the corresponding Weibull modulus for other known silicon carbide materials. As such, the inventive materials are quite suitable for use in the optical applications disclosed herein.

EXAMPLES 4 THROUGH 9

An ultrafine-grain sized alpha silicon carbide powder is used as a starting material to prepare and fabricate the inventive alpha SiC compositions which are the subject of the invention. The starting powder is selected to be alpha type and has a BET surface area of 15+1 m$^2$/g.

Based on the surface area of the starting alpha SiC powder aluminum nitride (AlN) powder having an average particle size of 3.8 micrometers is used as a processing aid.

The alpha SiC and AlN powders are dispersed in an anhydrous, low viscosity non-reactive liquid and the viscosity of the mixture adjusted by the addition of the liquid so that the viscosity of the mixture falls within a range of 200 to 500 centipoise. The mixtures are milled using silicon nitride balls in a ball mill to achieve a homogeneous mixture.

| Example | SiC Powder wt., g | AlN Powder wt., g | Solvent Type | Solvent Quantity, ml | Grinding times, hrs. | Results |
|---|---|---|---|---|---|---|
| 4 | 5000(α) | 187.5 | Methanol | 9300 | 4 | Homogeneous |
| 5 | 5000(β) | 75.0 | Ethanol | 9000 | 6 | Homogeneous |
| 6 | 5000(β) | 187.5 | Acetone | 9300 | 5 | Homogeneous |
| 7 | 5000(α) | 187.5 | Methylethyl ketone | 9300 | 4 | Homogeneous |
| 8 | 5000(α) | 112.5 | Methylethyl Ketone-ethanol azeotrope | 9000 | 5 | Homogeneous |
| 9 | 5000(α) | 187.5 | Isopropyl alcohol | 9300 | 6 | Homogeneous |

The homogenized mixtures are pan-dried and then dry-milled after which they are screened using a 30 mesh screen. The resulting powders are hot-pressed using an inert atmosphere as summarized in the following table:

| Example | Temperature °C. | Pressure, Psi | Results |
|---|---|---|---|
| 4 | 2000 | 2500 | Weibull modulus >18; test specimens fail by intergranular fracture |
| 5 | 2000 | 2500 | Weibull modulus >18; test specimens fail by intergranular fracture |
| 6 | 2000 | 2500 | Weibull modulus >18; test specimens fail by intergranular fracture |
| 7 | 2000 | 2500 | Weibull modulus >18; test specimens fail by intergranular fracture |
| 8 | 2000 | 2500 | Weibull modulus >18; test specimens fail by intergranular fracture |
| 9 | 2000 | 2500 | Weibull modulus >18; test specimens fail by intergranular fracture |

Regardless of whether the initial silicon carbide material is of the alpha type or beta type, the finished product comprises an alpha type silicon carbide ceramic material. As should be understood, beta type silicon carbide converts to alpha type silicon carbide at about 1850°–1900° C., a temperature exceeded in all applications and examples.

Accordingly, an invention has been disclosed in terms of a material, the process of manufacturing the material and its end uses which fulfill each and every one of the objects of the invention as set forth hereinabove and provide a new and useful invention of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. A process for making a silicon carbide ceramic material for use in making an optical device including the steps of:
   a) preparing a powder consisting of at least 92%, by weight, pure Silicon Carbide powder, said Silicon Carbide powder comprising alpha-type SiC or beta-type SiC, said powder having an average particle diameter of 0.3 to 3 micrometers;
   b) adding to said powder a densification agent in a ratio of from 0.1% up to 0.25%, by weight, of densification agent for each $m^2/g$ of surface area of said powder to form a powder mix;
   c) homogenizing said powder mix and densification agent utilizing either a dry procedure or a wet mill process;
   d) subjecting homogenized powder mix and densification agent to a hot pressing operation including the step of obtaining a state of substantially closed porosity of said material before temperature exceeds 1900° C. whereby said densification agent is precluded from volatizing and is thereby captured within said material;
   e) cooling said homogenized powder mix and densification agent; and
   f) polishing a surface of said material, said material exhibiting intergranular fracture.

2. The process of claim 1, wherein said powder mix includes Silicon Carbide powder including, by weight, from 0.01% to 2% Iron, from 0.01% to 1.5% Aluminum, from 0.1% to 2% free Carbon, from 0.02% to 3% Silicon Dioxide and from 0.01% to 0.15% free Silicon.

3. The process of claim 1, wherein said densification agent comprises Aluminum Nitride.

4. The process of claim 3, wherein said Aluminum Nitride is coated with a protective film.

5. The process of claim 1, wherein said homogenizing step includes use of ethanol, methanol or isopropyl alcohol or a ketone solvent such as methylethyl ketone.

6. The process of claim 1, wherein said dry procedure includes the step of milling until homogeneous.

7. The process of claim 5, wherein said wet procedure includes the step of drying to remove carrier agents.

8. The process of claim 1, wherein said dry procedure includes a mixing cycle to homogenize ingredients.

9. The process of claim 1, wherein said wet mill process includes the step of screening through mesh.

10. The process of claim 1, wherein said hot pressing operation includes the step of gradually increasing temperature from 1630° C. to over 2000° C. while concurrently increasing pressure.

11. The process of claim 10, wherein said hot pressing operation includes the step of achieving at least 80% of theoretical density of said ceramic material before said temperature is raised above 1900° C.

* * * * *